(12) United States Patent
Seo et al.

(10) Patent No.: US 10,391,037 B2
(45) Date of Patent: Aug. 27, 2019

(54) PORTABLE SMART MEDICINE CASE USING GUARDIAN NOTIFYING FUNCTION AND MEDICATION TIME NOTIFYING SYSTEM INCLUDING SAME

(71) Applicant: IOTEEN CO., LTD., Incheon (KR)

(72) Inventors: Byung Hyun Seo, Incheon (KR); Yun Ho Kim, Uiwang-si (KR)

(73) Assignee: IOTEEN CO., LTD., Incheon (KR)

( * ) Notice: Subject to any disclaimer, the term of this patent is extended or adjusted under 35 U.S.C. 154(b) by 0 days.

(21) Appl. No.: 16/089,534

(22) PCT Filed: Dec. 21, 2016

(86) PCT No.: PCT/KR2016/015000
§ 371 (c)(1),
(2) Date: Sep. 28, 2018

(87) PCT Pub. No.: WO2017/217626
PCT Pub. Date: Dec. 21, 2017

(65) Prior Publication Data
US 2019/0105235 A1 Apr. 11, 2019

(30) Foreign Application Priority Data
Jun. 13, 2016 (KR) .......................... 10-2016-0073069

(51) Int. Cl.
*G08B 21/00* (2006.01)
*A61J 7/04* (2006.01)
(Continued)

(52) U.S. Cl.
CPC ............... *A61J 7/0436* (2015.05); *A61J 1/03* (2013.01); *A61J 7/04* (2013.01); *B65D 1/24* (2013.01);
(Continued)

(58) Field of Classification Search
None
See application file for complete search history.

(56) References Cited

FOREIGN PATENT DOCUMENTS

JP 3127314 11/2006
JP 2012-115533 * 6/2012
(Continued)

OTHER PUBLICATIONS

International Search Report for International Application No. PCT/KR2016/015000; dated Mar. 13, 2017.
(Continued)

*Primary Examiner* — Adolf Dsouza
(74) *Attorney, Agent, or Firm* — Kile Park Reed & Houtteman PLLC (57) ABSTRACT

The invention is a portable smart medicine case which comprises: a body 110 having a plurality of medicine chambers 111 to contain medicines M; a cover 120 covering the medicine chambers 111; and an electronic tag 130 provided on either the body 110 or the cover 120 of the medicine case to communicate with a user device 200 via NFC or RFID mode, the user device 200 being installed an alarm application which generates alarm signals when it becomes a medicine taking time, wherein, an alarm release information is stored on the electronic tag 130, and the electronic tag 130 transmits the alarm release information to the user device 200 when it is brought near to the user device 200 so that the alarm operation of the user device 200 is to be released.

3 Claims, 12 Drawing Sheets

(51) Int. Cl.
    *B65D 1/24*       (2006.01)
    *B65D 81/26*     (2006.01)
    *B65D 51/24*     (2006.01)
    *G06Q 50/22*     (2018.01)
    *G06K 19/07*     (2006.01)
    *G08B 21/24*     (2006.01)
    *A61J 1/03*       (2006.01)

(52) U.S. Cl.
    CPC ............. *B65D 51/24* (2013.01); *B65D 81/26* (2013.01); *G06K 19/07* (2013.01); *G06Q 50/22* (2013.01); *G08B 21/24* (2013.01); *A61J 7/0454* (2015.05); *A61J 2205/60* (2013.01)

(56) References Cited

FOREIGN PATENT DOCUMENTS

| | | | |
|---|---|---|---|
| JP | 2015-024040 | | 2/2015 |
| JP | 2015-024040 | * | 5/2015 |
| KR | 20-2000-0006512 | | 4/2000 |
| KR | 10-1584541 | | 1/2016 |

OTHER PUBLICATIONS

English Translation of Written Opinion of the International Searching Authority dated Mar. 13, 2017 associated with International Application No. PCT/KR2016/015000.

* cited by examiner

PORTABLE SMART MEDICINE CASE USING GUARDIAN NOTIFYING FUNCTION AND MEDICATION TIME NOTIFYING SYSTEM INCLUDING SAME

TECHNICAL FIELD

The invention relates to a portable smart medicine case using medication guardian notifying function and the medication time notifying system including same, and more particularly to a portable smart medicine case being capable of carrying medicines cleanly in partitioned chambers and easily releasing the alarm operation by just bring it to the user device having alarm function for taking time and the medication time notifying system including the same.

BACKGROUND ART

Generally, when the medicines are prepared in the pharmacy, the pharmacist may mark the medicine taking time on the pack or bag of the medicines. But as the taker usually takes medicines by being depended on his memory on the taking timing, it happens that a taker with weak memory or a busy taker may forget the taking time and miss of taking medicine, or he may take the same medicines two times repeatedly. Considering this situation, a smart medicine case was suggested which generates alarm of medicine taking by activating an alarm lamp and alarm speaker provided on the medicine case when it becomes medicine taking time in association with the smart application.

But this conventional smart medicine case must include an alarm lamp, a battery, a communication module to communicate control signal to a smartphone via Bluetooth or Wi-Fi, and a controller, which results in higher cost of product and maintenance cost due to battery changing. In addition, even though the user has taken the medicine timely, but he may forget to press a confirm button on the application in the smartphone, then the alarm event may be repeated to transmit alarm message. Therefore, the user must press the confirm button of the application whenever the user acknowledges the alarm and takes medicines.

DISCLOSURE

Technical Problem

The invention is proposed to solve the above problems, and the object of the invention is to provide a portable smart medicine case in which, when it becomes medicine taking time, the alarm operation can be implemented by the speaker, the vibrator, the display, the controller and the battery equipped in the user device such as user's smartphone, so the manufacturing cost of the smart medicine case can be much reduced, and the maintenance cost for alarm operation is not almost required, and it can transmit an alarm releasing information by just bring the smart medicine case to the user device to achieve user's convenience.

Technical Solution

According to an aspect of the invention, there is provided a portable smart medicine case which comprises:
a body 110 having a plurality of medicine chambers 111 to contain medicines M; a cover 120 covering the medicine chambers 111; and an electronic tag 130 provided on either the body 110 or the cover 120 of the medicine case to communicate with a user device 200 via NFC or RFID mode, the user device 200 being installed an alarm application which generates alarm signals when it becomes a medicine taking time, wherein, an alarm release information is stored on the electronic tag 130, and the electronic tag 130 transmits the alarm release information to the user device 200 when it is brought near to the user device 200 so that the alarm operation of the user device 200 is to be released.

According to the other aspect of the invention, there is provided a portable smart medicine case wherein;
the body 110 is shaped so that the medicine chambers 111 having upper openings are disposed in series circumferentially, and a central chamber 112 having a lower opening and communicated with the medicine chamber 111 through air holes 117 is disposed on the central part of the body 110, the central chamber 112 includes a dehumidifier 150 to remove the humidity in the medicine chamber 111, and a central cover 160 to cover the lower opening of the central chamber 112.

According to other aspect of the invention, there is provided a portable smart medicine case wherein; the cover 120 includes a plurality of individual lids 121 to individually open and close the medicine chambers 111, the user device 200 initiates to read the alarm release information on the electronic tag 130 after a preset waiting time from the start of alarm operation, a first packing 122 is provided between the body 110 and the individual lid 121 to seal the medicine chamber 111, a second packing 161 is provided between the body 110 and the central chamber 112 to seal the central chamber 112, a plurality of recesses 115 are formed on the circumferential lower part of the body 110 adjacent to each corresponding individual lid 121 so that the front end of the lid 121 should be projected from the body 110.

According to other aspect of the invention, there is provided an alarm system of medicine taking time comprises:
a smart medicine case 100 including a body 110 having a plurality of medicine chambers 111 to contain medicines M, a cover 120 covering the medicine chambers 111, and an electronic tag 130 provided on either the body 110 or the cover 120 of the medicine case 100 and storing an alarm release information; and a user device 200 having a tag reader 220 to communicate with the electronic tag 130 via NFC or RFID mode to receive the alarm release information from the electronic tag 130, and being installed an alarm application which generates alarm signals when it becomes a medicine taking time, and releases the alarm signals when it receives an alarm release information from the smart medicine case 100.

According to other aspect of the invention, there is provided an alarm system of medicine taking time wherein; the user device 200 initiates to read the alarm release information on the electronic tag 130 after a preset waiting time from the start of alarm operation.

Advantageous Effect

According to the invention, in order to implement alarm operation about the medicine taking time in association with the user device such as the user's smart phone, contrary to the conventional method in which alarm action is operated by use of a speaker or an alarm lamp on the side of the smart medicine case, it implements the alarm operation by activating a speaker 271, a vibrator 272, an alarm lamp 274 and a display 273 equipped on the user device 200, so the smart medicine case need not have a speaker, an alarm lamp, a controller and a battery, so manufacturing cost of the smart medicine case is much reduced, and maintenance cost for alarm operation is not almost required.

And, as the smart medicine case 100 includes an electronic tag 130 storing the alarm release information, and it can transmit the alarm release information by using the tag reader 220 equipped on the user device 200 basically via non-contact wireless type communication such as NFC or RFID, the user can release the alarm operation and the alarm message sending by merely bring the user device 200 near to the smart medicine case 100, so it can enhance the user's convenience.

And, as the user device 200 initiates the alarm operation when it comes to the preset medicine taking time, but the user device 200 regards the alarm release information on the electronic tag 130 as effective information after a preset waiting time from the start of alarm operation, it can prevent a malfunction such that, in case the smart medicine case 100 is kept near to the user device 200, the alarm release information can be transmitted from the electronic tag 130 of the smart medicine case 100 to the user device 200 unwantedly as soon as the user device 200 generates the alarm of medicine taking time.

And, as the central chamber 112 having a lower opening and communicating with the medicine chamber 111 through the air holes 117 is disposed on the central part of the body 110, and includes a dehumidifier 150 to remove the humidity in the medicine chamber 111, the medicines in the medicine case is prevented from deteriorating due to humidity And, as the central cover 160 is provided on the lower part of the body 110 to cover the central chamber 112, and a first packing 122 is provided between the body 110 and the individual lid 121 to seal the medicine chamber 111, and a second packing 161 is provided between the body 110 and the central chamber 112 to seal the central chamber 112, even though the smart medicine case 10 is dropped into water or it is washed in the laundry, the medicines M in the medicine case is prevented from deteriorating, deformation or infiltration of foreign material.

And, as a recess 115 is formed on the circumferential lower part of the body 110 adjacent to the corresponding individual lid 121 so that the front end of the lid 121 should be projected from the body 110, the individual lid 121 can be easily opened by the user's finger end.

DETAILED DESCRIPTION OF THE INVENTION

Hereinafter, the preferred embodiments of the invention will be described with reference to the drawings.

Figure 1:
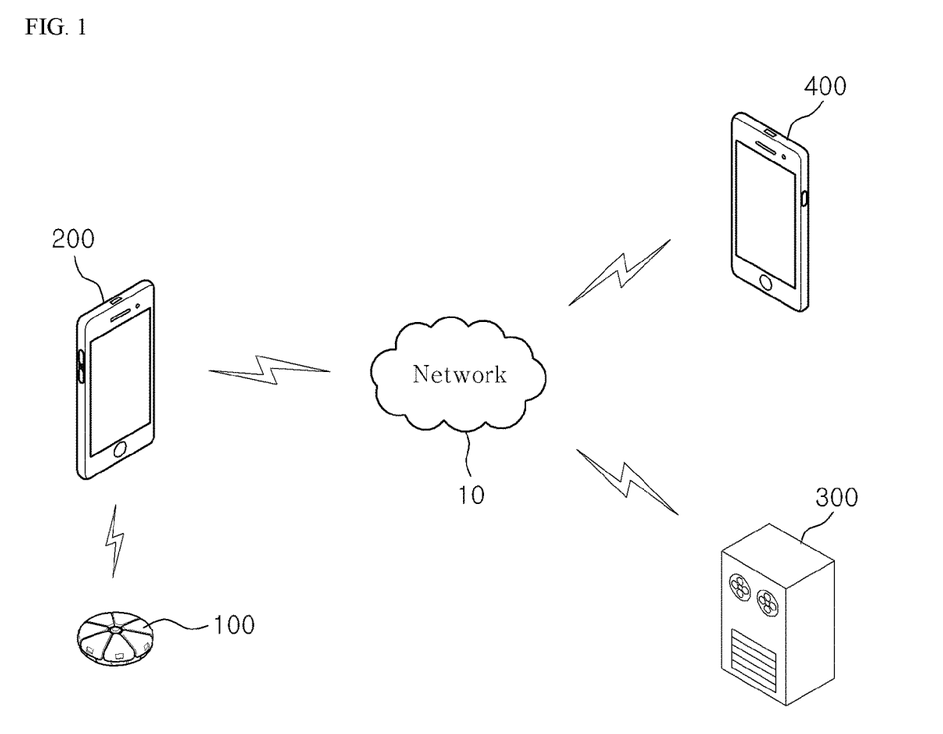
FIG. 1 is a schematic diagram of alarm system of medicine taking time according to the invention

The smart medicine case and the alarm system of medicine taking time of the invention generates alarm such as sound, vibration, lamp flickering or displaying by use of a speaker 261, a vibrator 272, a lamp 272, a display 273, a controller 230 and a battery (not shown) equipped on the user device 200, so the manufacturing cost can be much reduced and the maintenance cost of the smart medicine case is not almost required. As shown in FIG. 1, the embodiment of the invention comprises a smart medicine case 100, a user device 200 and a main server 300.

Figure 4:
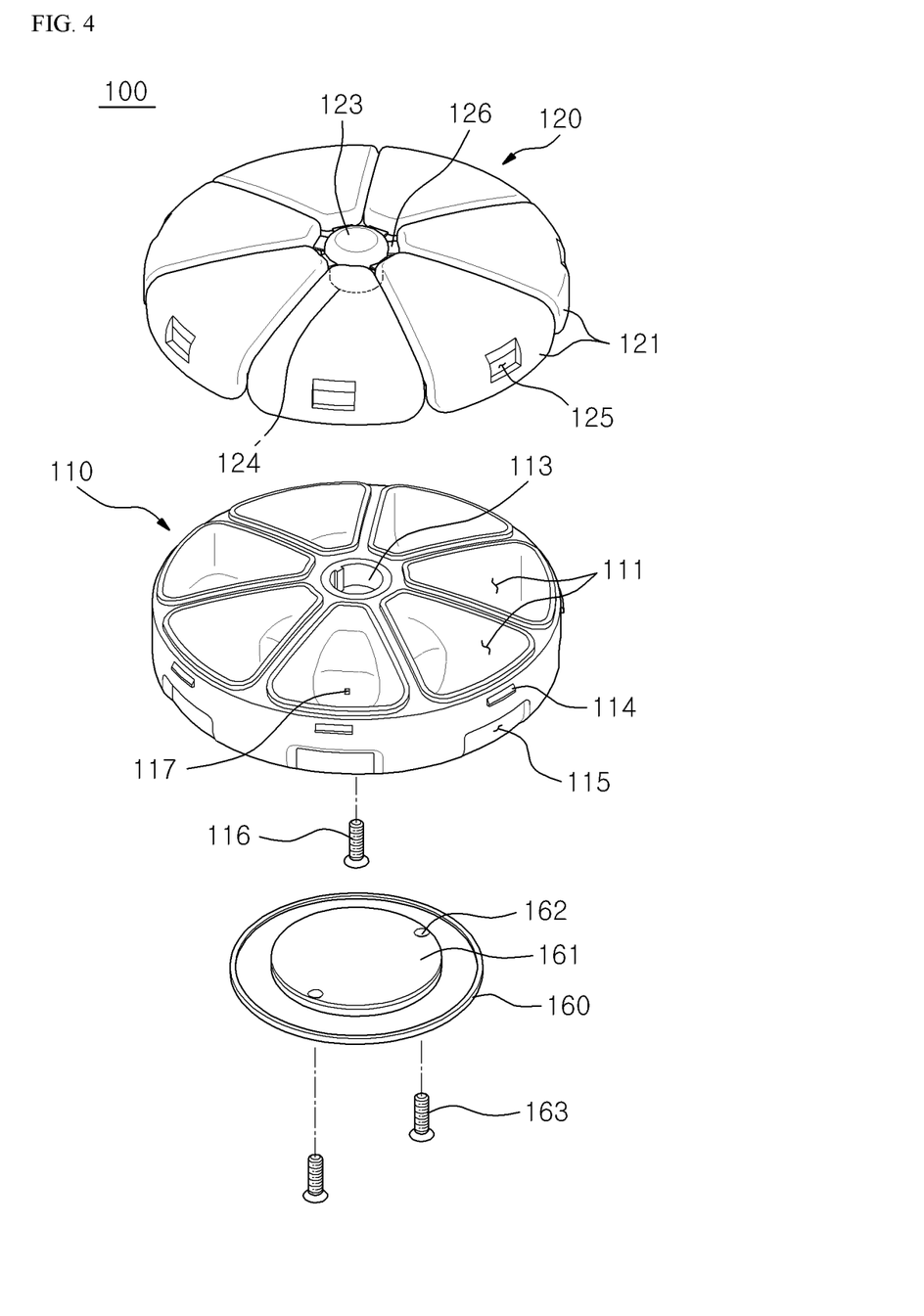

The smart medicine case 100 is a portable medicine container in which medicines of pill or tablet type can be contained and is carried by the user, and it includes a body 110, a cover 120 and an electronic tag 130. The body 110 comprises a plurality of medicine chambers 111 having upper opening and disposed in series circumferentially. As shown in FIG. 4, the body 110 is in the shape of disc and has a mounting hole 113 on the center of it to mount the cover 120, and the medicine chambers 111 are disposed along the periphery of the mounting hole 113, and a first locker 114 is disposed along the circumference of the body 110 correspondingly to each medicine chamber 111 for locking the individual lid 121.

In the illustrated embodiment, seven medicine chambers 111 are formed in the body 110 to contain a dosage per day in each medicine chamber 111 for a week. Alternatively, three chambers 111 may be formed in the body 111 to contain three dosages per day in each medicine chamber such as for morning, noon and evening. Or it may comprise only one medicine chamber 111 in the medicine case if all medicines are the same for each dosage. In case that seven medicine chambers 111 are formed in the body 110, then the inner space of each medicine chamber 111 can be partitioned to contain the medicine M separately depending on taking time.

Figure 2:
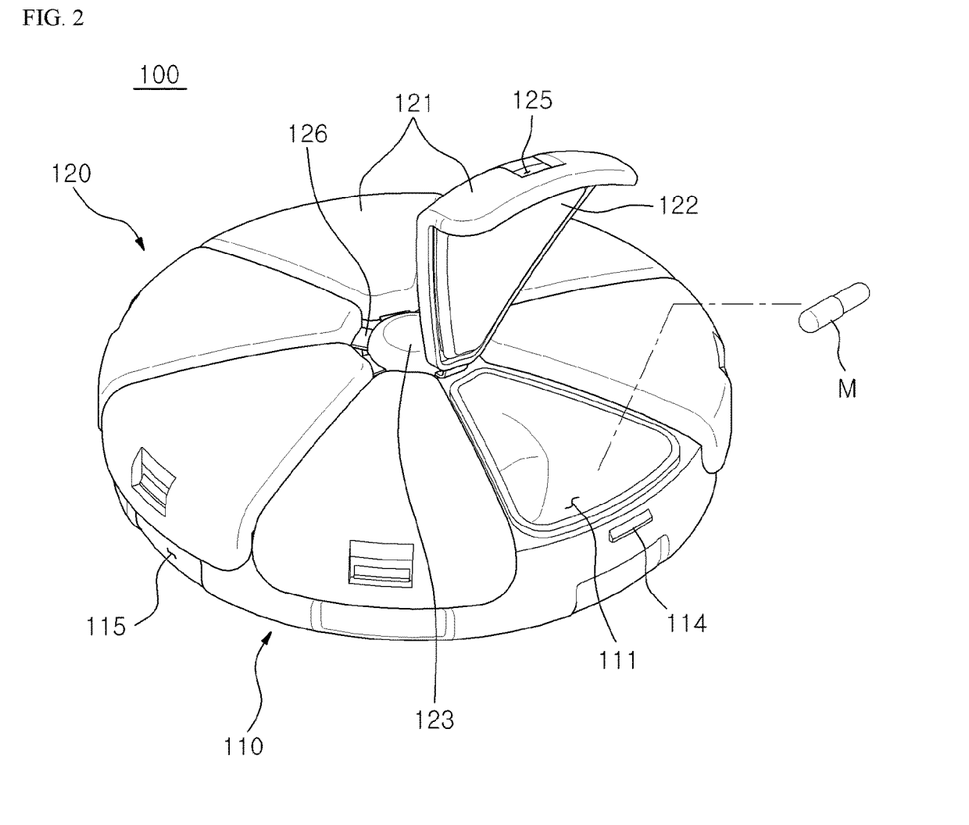
FIG. 2 to FIG. 5 are perspective, plan, exploded perspective and side section of the smart medicine case of the embodiment according to the invention
Figure 3:
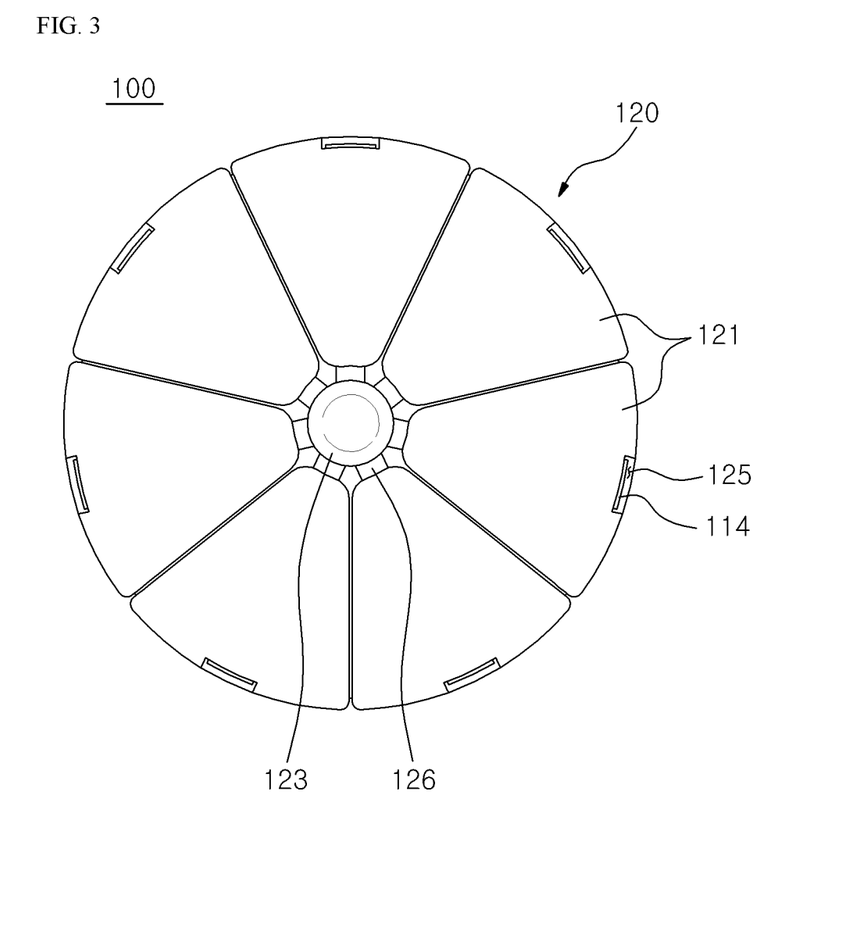

The cover 120 is to cover the medicine chamber 111 and comprises a plurality of individual lid 121 to cover each medicine chamber 111 separately. As shown in FIG. 2 to FIG. 4, the cover 120 includes a mounting portion 123 having a mounting insert 124 projecting downward on the center of the body 110, the mounting insert 124 being engaged with the mounting hole 113. And the individual lid 121 is hinged on the mounting portion 123 at the base end and disposed in series circumferentially around the mounting portion 123, and the second locker 125 is formed at the front end of the lid 121 to be engaged with the corresponding first locker 114 of the body 110. So, the medicine chamber 111 is opened and closed by the lid 121 hinged at the base end of it and is locked by engaging the first locker 114 with the second locker 125 at the front end of the lid 121.

Figure 6:
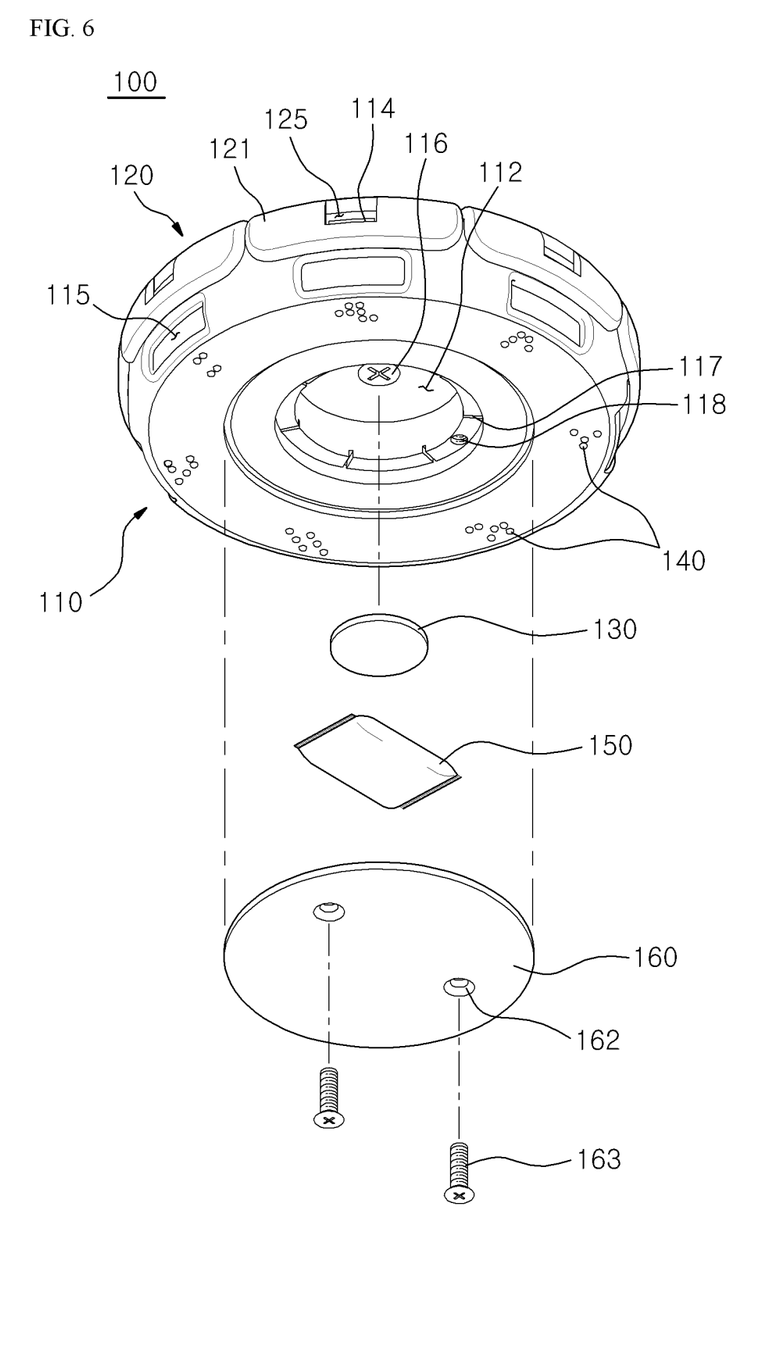
FIG. 6 is an exploded perspective showing the central chamber, dehumidifier and central cover

As shown in FIG. 6, Brailles marking 140 may be formed on the lower surface of the body 110 corresponding to each medicine chamber 111 or on each lid 121 to indicate the taking day of week or taking time of day to assist the visually impaired person.

Figure 5:
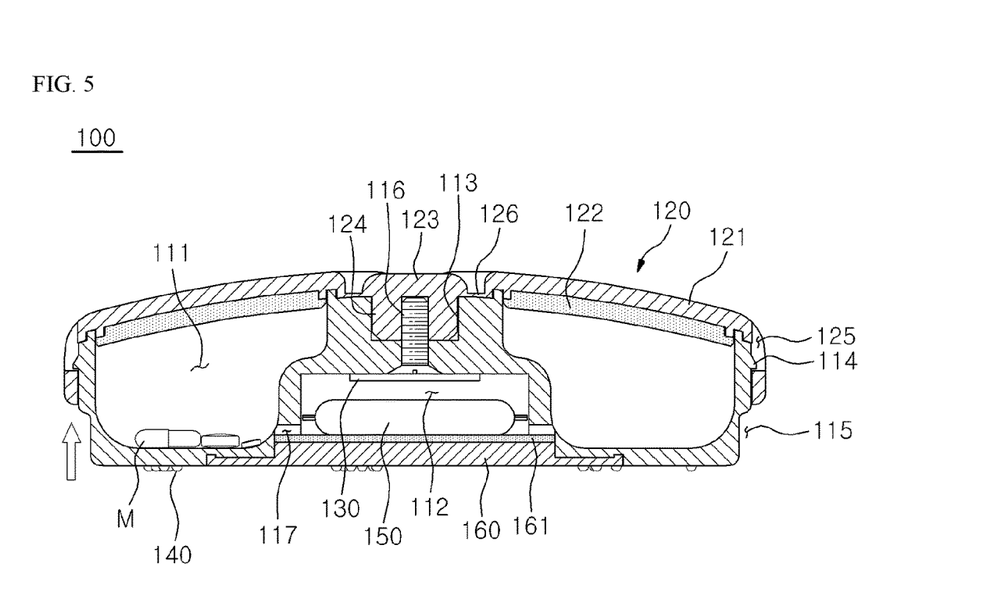

And, as shown in FIG. 5 and FIG. 6, a central chamber 112 is formed on the central part of the body 110, which has a lower opening and communicates with the adjacent medicine chamber 111 through air holes 117, and a dehumidifier 150 is placed in the central chamber 112, and a central cover 160 is provided to cover the lower opening of the central chamber 112. And an electronic tag 130 is placed in the central chamber 112. Accordingly, the medicines M in the medicine chamber 111 are prevented from deteriorating by humidity, and the dehumidifier 160 and the electronic tag 130 are easily replaced by opening the central cover 160. Screw holes 162,118 are formed on the central cover 160 and on the corresponding lower surface of the body 11, and fasteners 163 such as male screws are engaged into the screw holes 162, 118 so that the central cover 160 can be tightly engaged with the body 110.

In addition, as a first packing 122 is provided between the body 110 and the individual cover 121 to seal each medicine chamber 111, and a second packing 161 is provided between the body 110 and the central cover 160 to seal the central chamber 112, even though the smart medicine case 10 is dropped into water or it is washed in the laundry, the medicines M in the medicine case is prevented from deteriorating, deformation or infiltration of foreign material.

As in FIG. 5 and FIG. 6, preferably a recess 115 is formed on the circumferential lower part of the body 110 adjacent to the first locker 114 of the corresponding individual lid 121 so that the front end of the lid 121 should be projected from the body 110. So, the individual lid 121 can be easily opened by the user's finger end.

As the body 110 is in the shape of disc having a plurality of medicine chambers 111 disposed around the mounting hole 113 or the central chamber 112, and the cover 120 is also in the shape of disc having a plurality of individual lids 121 disposed around the mounting portion 123, the smart medicine case 100 can be small, compact and easily gripped by user, and the appearance of the medicine case 100 can be nice and refined.

Figure 7:
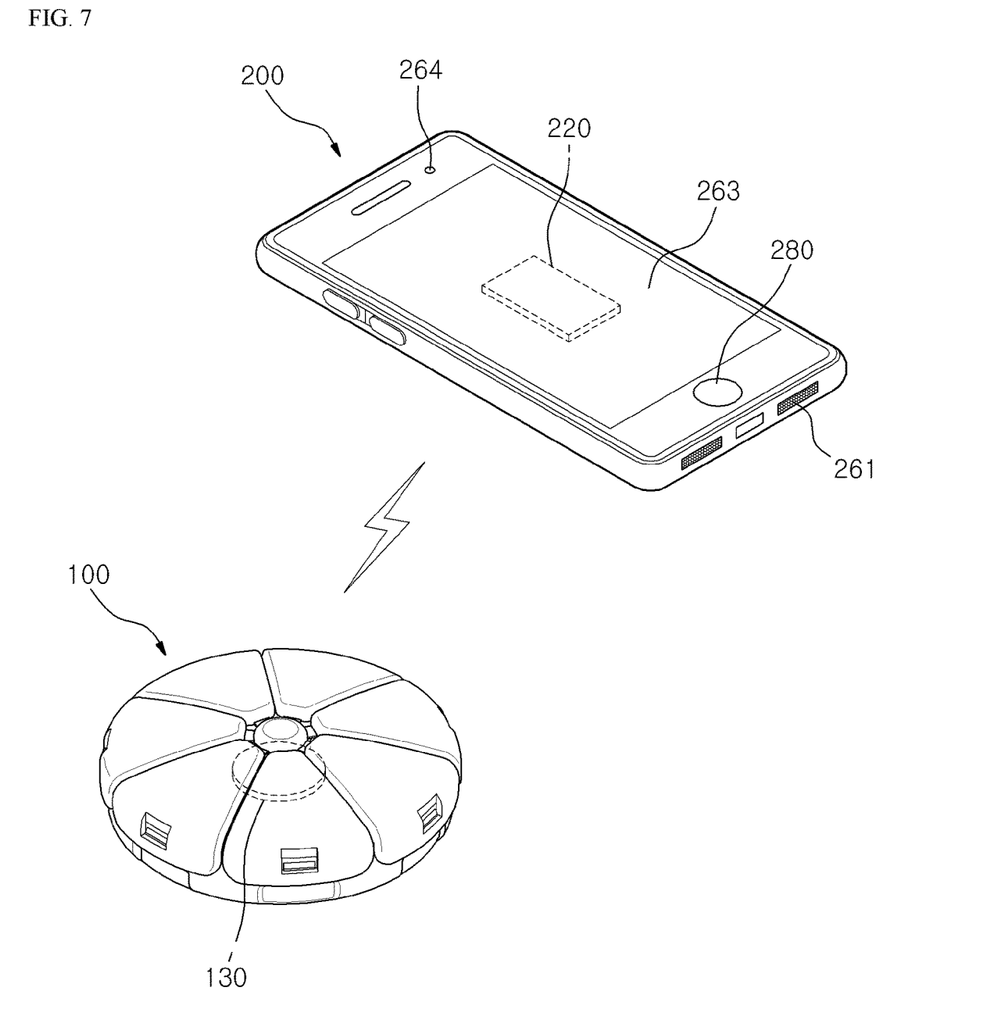
FIG. 7 is a diagram of tag connection between the smart medicine store and the user device

The electronic tag 130 stores an alarm release information which is to stop alarm operation or sending of message that the user has not taken medicine by alarm application on the user device 200. The electronic tag 130 communicates with the user device 200 though the non-contact wireless connection such as NFC or RFID to transmit the alarm release information. If the user device 200 receives the alarm release information, then the alarm operation and sending of message of not taking medicine are stopped.

The user device 200 may be a smart phone of user who uses the smart medicine case 100 and it includes a tag reader 220 to receive an alarm release information by reading the electronic tag 130. An alarm application is installed on the user device 200. The alarm application operated as follows. When it is time to take medicine M, the user device 200 generates alarm operation by means of sound, vibration, lamp flickering or displaying. If a preset time, that is, a preset delayed taking time passes from start of alarm operation, then the user device 200 automatically sends an alarm message to the predetermined guardian device 400 the fact that the user has not yet taken medicines. But, if it receives an alarm release information before the delayed taking time by tag contact, then alarm operation and sending message are stopped.

The guardian device 400 is a device which is carried or handled by the guardian such as a family, a nurse who can help or supervise the user's taking of medicine, and it can be smartphone or PC which can receive an alarm message about not taking medicine or other data from the user device 200, and it can connect to the main server as mentioned below to receive medicine taking state information of the user through network 10.

Figure 8:
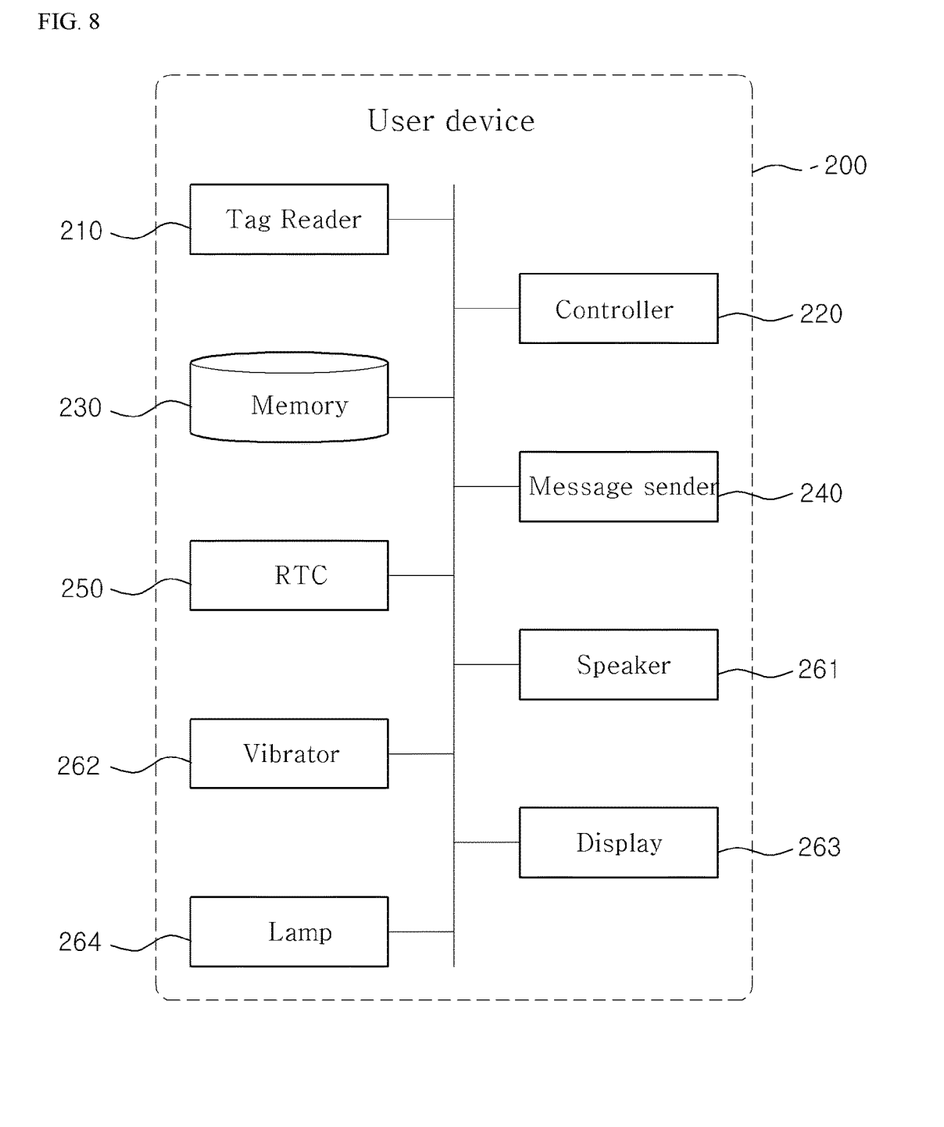
FIG. 8 is a diagram of user device of the embodiment according to the invention

FIG. 8 shows a diagram of the user device of the embodiment according to the invention. As shown, the user device 200 comprises of a tag reader 210 to receive an alarm release information from the electronic tag 130 of the smart medicine case 100 by tag contacting with the electronic tag 130, a controller 220 outputting control signals according to the program of the alarm application, a memory 230 storing data to drive the alarm application, a message sender 240 sending alarm message about not taking medicine to the guardian device 400 under a predetermined condition, a RTC (Real Time Clock; 250) providing the information of real time, a speaker 261 generating sound alarm, a vibrator 262 generating vibration alarm, a lamp 262 generating flickering alarm, and a display 263 showing an alarm image.

If it becomes the preset taking time, the user device 200 initiates alarm operation, and after a preset waiting time (e.g. 3 to 5 seconds) from the start of alarm operation, the tag reader 220 starts to read the alarm release information, or alternatively the controller 220 regards the alarm release information input within the preset waiting time as not noise data, and regards the alarm release information input only after the preset waiting time as effective data to stop the alarm operation. This is advantageous to prevent malfunction such that, when the smart medicine case 100 and the user device 200 are placed in the same pocket or on other places, the user device 200 may receive an unintended alarm release information as soon as the alarm of taking time was generated within the preset waiting time, so the user can not recognize the alarm of taking time properly.

The alarm application is programmed as follows. If it becomes preset taking time, then it initiates alarm operation firstly during a preset alarm duration (e.g. 30 seconds). If the preset alarm duration passes, the alarm operation stops. It can receive alarm release information from the smart medicine case 100 by tag reading of the tag reader 220 only within the preset normal taking time (e.g. 30 minutes) from the start of alarm operation. If the alarm release information is input within the preset alarm duration, the alarm operation is stopped, and if the alarm release information is input within the preset normal taking time, it decides that the user took the medicine M within the preset normal taking time.

If the alarm duration of the first alarm operation passes, then the second alarm operation is carried out after a preset waiting time, and the alarm release information can be input from smart medicine case 110 by tag reading of the tag reader 220 during the preset delayed taking time (e.g. 30 minutes) from the second alarm operation. If the alarm release information is input within said delayed taking time, then it decides that the user took the medicine M lately within the preset taking time. If the alarm release information is not input within said delayed taking time, then it decides that the user did not take the medicine M within the taking time.

The alarm release information can be input regardless of the activating alarm operation within the preset normal taking time or preset delayed taking time. Or the alarm release information can be input in response to the activating alarm operation. And, a separate alarm confirmation button can be provided on the alarm application, and if the user touches the alarm confirmation button, the alarm release action can be carried out.

Meanwhile, the main server 300 receives the data of medicine taking and non-taking from each user device 200 periodically or at time of alarm event through the network 10, manages those data in time series for each user, and sends the information of user's medicine taking state to the user device 200 or the guardian device 400 by request.

Figure 9:
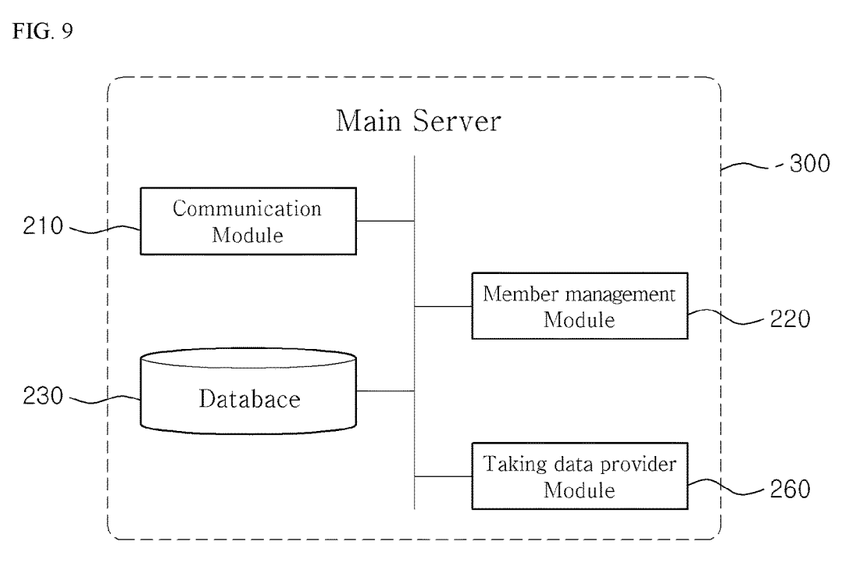
FIG. 9 is a diagram of main server of the embodiment according to the invention FIG. 10
Figure 10:
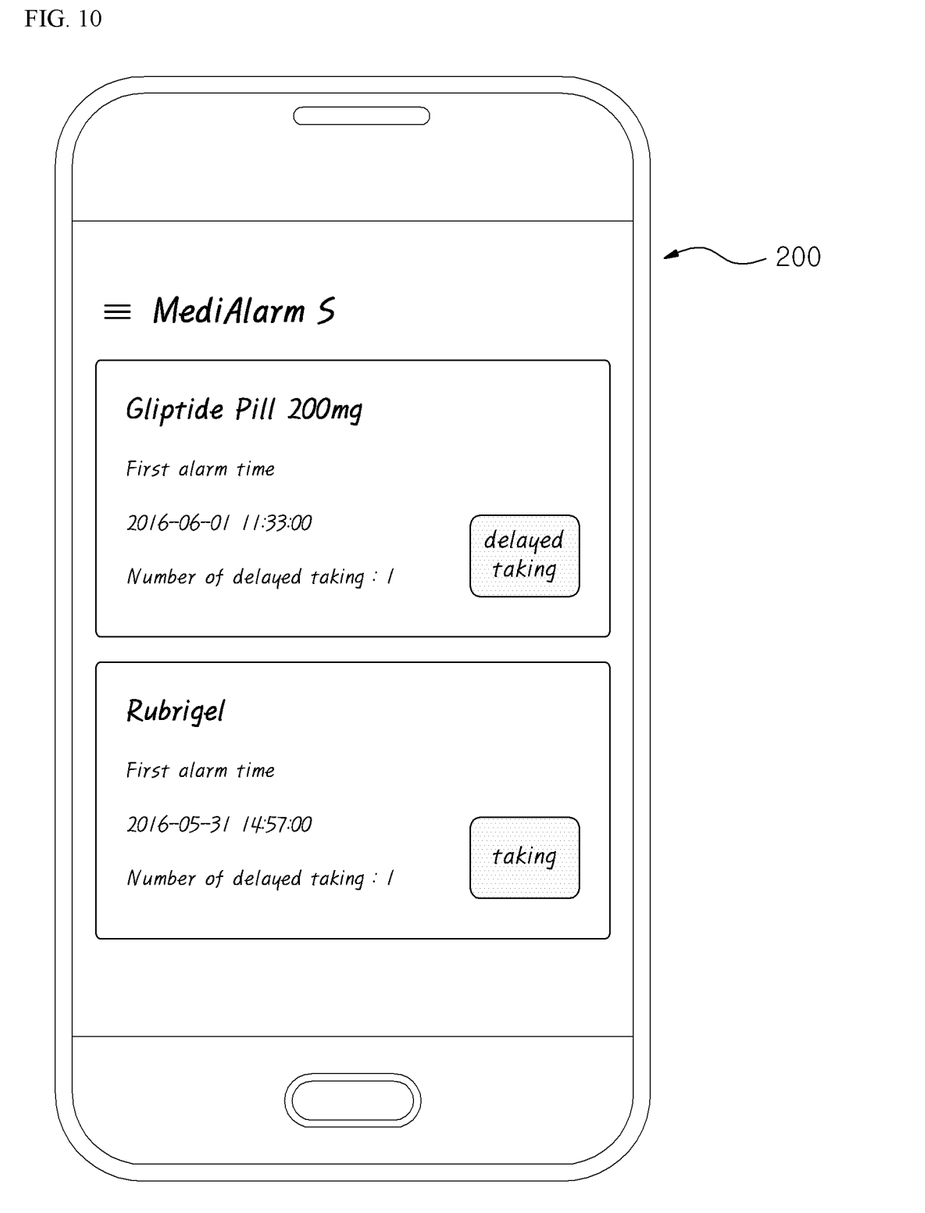
Figure 11:
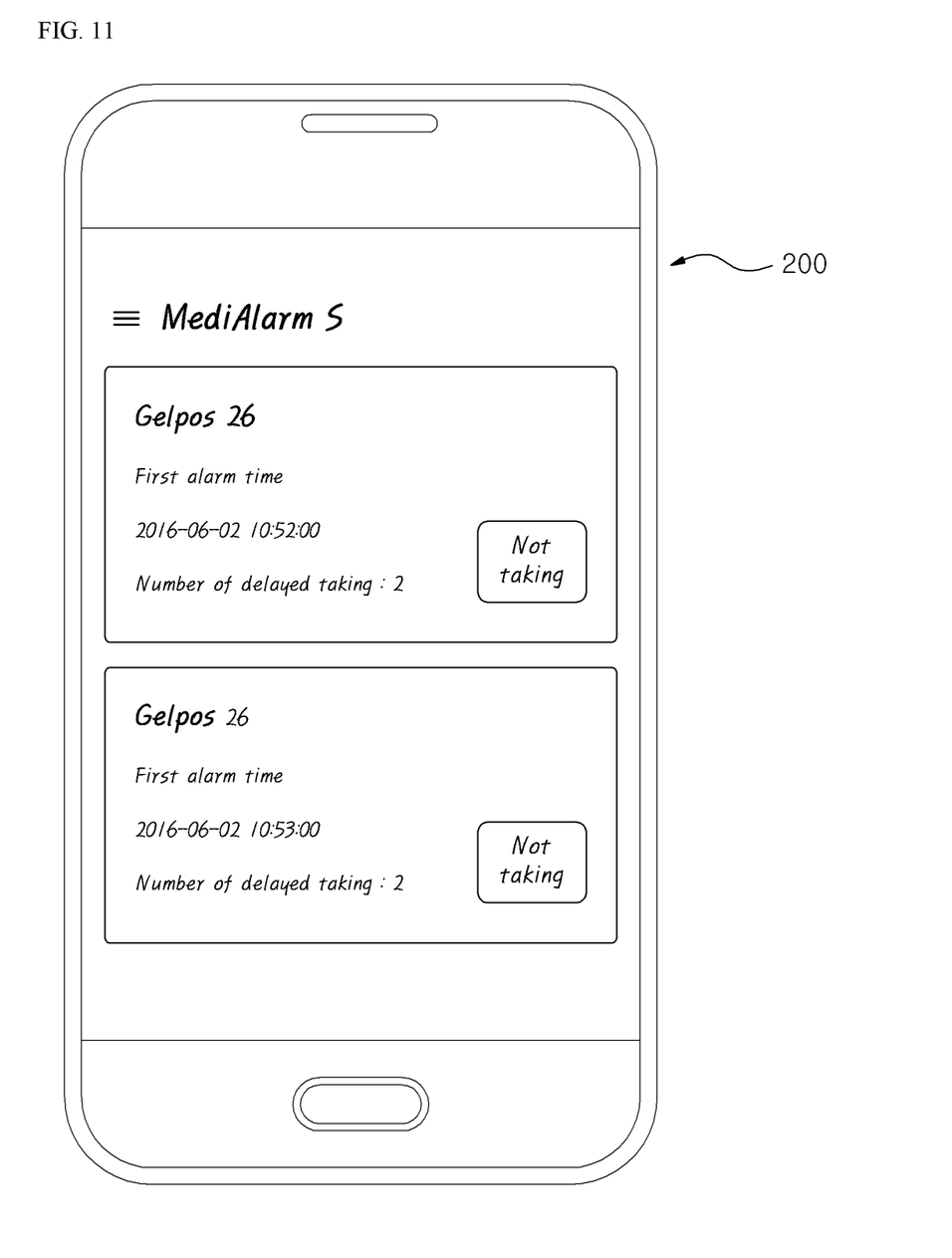
FIG. 11 is an exemplary display of the alarm application of the user device

FIG. 9 shows the diagram of the main server 30. As shown, the main server 300 comprises a communication module 210 to receive data from the user device 200 and the guardian device 400 through network 10, a member management module 220 to register users as member and manage the personal information of users, a database 230 to store data inclusive of user medicine taking data, a taking data provider module 260 to readout the taking data from the database 230 and provide them to the user device 200 and guardian device 400 by request. Accordingly. The user or guardian can access the main server 300 through the user device 200 or the guardian device 400 to get the information about the kind of medicine taken by user and whether user took the medicine M timely as shown in the display of FIG. 10 and FIG. 11.

Figure 12:
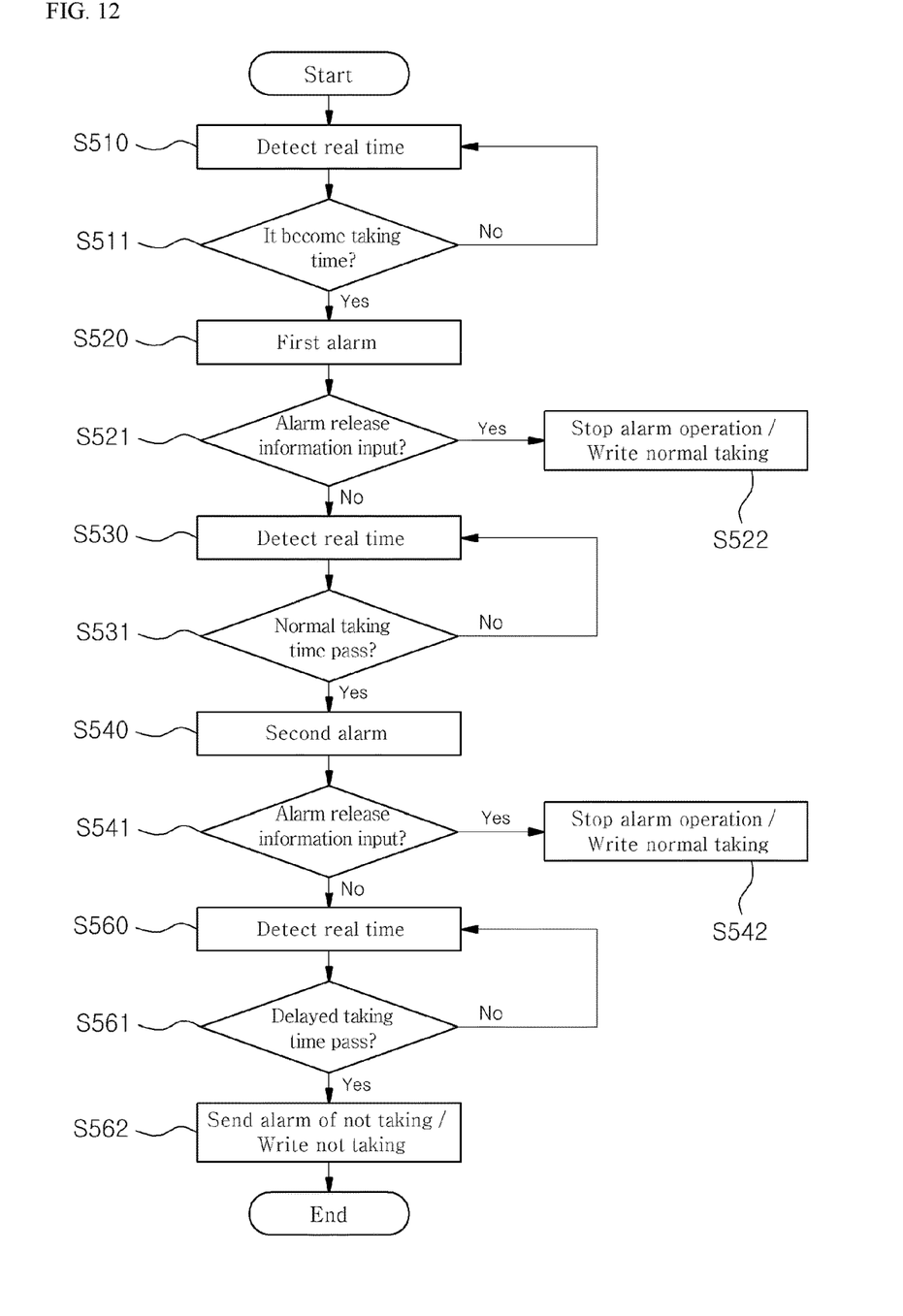
FIG. 12 is a flowchart of the operation of alarm system of medicine taking time according to the invention

Now, the mechanism of alarm system of medicine taking time will be described in reference with FIG. 12. First, the user puts the medicines M into the medicine chambers 111, the medicines M being divided by the day of week or the time of day, activates the alarm application on the user device 200 and inputs or sets the taking time for each medicine chamber 110. For example, it is regarded that the recently coming taking time is 12:00, alarm duration is 30 seconds, normal taking time and delayed taking time are 30 minutes respectively, and tag reading waiting time is 3 seconds.

If the taking time is set, then RTC250 of the user device 200 detects real time (S51), then sends it to the controller 220. Then, the controller 220 compares the real time information from RTC250 with the preset taking time information and decides whether it becomes taking time (S511). If it decides that it becomes taking time, then the user device 200 initiates the first alarm operation by means of a speaker 271, a vibrator 272, a lamp 274 or a display 273 during preset 30 minutes (S520).

At the same time, the tag reader 220 is activated and carries out a tag reading action for 30 minutes of normal taking time. If tag reading waiting time is preset as 5 seconds, then alarm operation is not carried out until 12:00: 05. After 5 seconds, the alarm operation initiates.

Then the controller 220 decides whether the alarm release information about the smart medicine case 100 is input (S521). If the alarm release information is input between the tag reading waiting time and the normal taking time, then the controller 220 releases or stops all the alarm operations and writes in the memory 230 that the medicine M is normally taken (S522), and sends the medicine taking information to the main server 300 and shares it with main server 300.

If the alarm release information has not been input, then the controller 220 detects the real time (S530) and decides whether the normal taking time passes (S531). If it decides that the normal taking time passes, then, it initiates the second alarm operation for the 30 minutes of delayed taking time (S540). If the alarm release information is input (S541), the controller 220 releases or stops all the alarm operations and writes in the memory 230 that the medicine M is lately taken (S542), and sends the medicine taking information to the main server 300 and shares it with main server 300.

If the alarm release information has not been input, then the controller 220 detects the real time (S560) and decides whether the delayed taking time passes (S561). If it decides that alarm release information has not been input within the delayed taking time, then it sends alarm message of not taking to the guardian device 400, and writes in the memory 230 that the medicine M is not taken (S562), and sends the not taking information to the main server 300.

The main server 300 collects the information about the state of normal taking, delayed taking and not taking in time series for each user, and sends it to the user device 200 or the guardian device 400 by request, therefore the user or the guardian can review the taking state as shown in the display of FIG. 10 and FIG. 11.

Though the preferred embodiment of the invention is described in accompany with the drawings, but various modifications or changes can be added or possible without departing the scope of the invention defined by the claims.

The invention claimed is:

1. A portable smart medicine case which comprises:
a body 110 having a plurality of medicine chambers 111 to contain medicines M; a cover 120 covering the medicine chambers 111; and an electronic tag 130 provided on either the body 110 or the cover 120 of the medicine case to communicate with a user device 200 via NFC or RFID mode, the user device 200 being installed an alarm application which generates alarm signals when it becomes a medicine taking time, wherein, an alarm release information is stored on the electronic tag 130, and the electronic tag 130 transmits the alarm release information to the user device 200 when it is brought near to the user device 200 so that the alarm operation of the user device 200 is to be released,
wherein the body 110 is shaped so that the medicine chambers 111 having upper openings are disposed in series circumferentially, and a central chamber 112 having a lower opening and communicated with the medicine chamber 111 through air holes 117 is disposed on the central part of the body 110, the central chamber 112 includes a dehumidifier 150 to remove the humidity in the medicine chamber 111, and a central cover 160 to cover the lower opening of the central chamber 112.

2. A portable smart medicine case of claim 1, wherein; the cover 120 includes a plurality of individual lids 121 to individually open and close the medicine chambers 111, the user device 200 initiates to read the alarm release information on the electronic tag 130 after a preset waiting time from the start of alarm operation, a first packing 122 is provided between the body 110 and the individual lid 121 to seal the medicine chamber 111, a second packing 161 is provided between the body 110 and the central chamber 112 to seal the central chamber 112, a plurality of recesses 115 are formed on the circumferential lower part of the body 110 adjacent to each corresponding individual lid 121 so that the front end of the lid 121 should be projected from the body 110.

3. An alarm system of medicine taking time comprises:
a smart medicine case 100 including a body 110 having a plurality of medicine chambers 111 to contain medicines M, a cover 120 covering the medicine chambers 111, and an electronic tag 130 provided on either the body 110 or the cover 120 of the medicine case 100 and storing an alarm release information; and a user device 200 having a tag reader 220 to communicate with the electronic tag 130 via NFC or RFID mode to receive the alarm release information from the electronic tag 130, and being installed an alarm application which generates alarm signals when it becomes a medicine taking time, and releases the alarm signals when it receives an alarm release information from the smart medicine case 100,
wherein; the user device 200 initiates to read the alarm release information on the electronic tag 130 after a preset waiting time from the start of alarm operation.

\* \* \* \* \*